US009852691B2

(12) United States Patent
Hyun

(10) Patent No.: US 9,852,691 B2
(45) Date of Patent: Dec. 26, 2017

(54) DISPLAY DEVICE, SYSTEM HAVING THE SAME, AND PIXEL

(71) Applicant: Samsung Display Co., Ltd., Yongin, Gyeonggi-do (KR)

(72) Inventor: Chang-Ho Hyun, Seoul (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 129 days.

(21) Appl. No.: 14/709,814

(22) Filed: May 12, 2015

(65) Prior Publication Data

US 2016/0210899 A1 Jul. 21, 2016

(30) Foreign Application Priority Data

Jan. 19, 2015 (KR) ........................ 10-2015-0008469

(51) Int. Cl.
*G09G 3/30* (2006.01)
*G09G 3/3258* (2016.01)
(Continued)

(52) U.S. Cl.
CPC ......... *G09G 3/3258* (2013.01); *G09G 3/2085* (2013.01); *H02J 5/005* (2013.01);
(Continued)

(58) Field of Classification Search
CPC ...... G09G 3/3258; G09G 3/2085; G09G 3/30; G09G 3/32; G09G 3/3208; G09G 2330/02;
(Continued)

(56) References Cited

U.S. PATENT DOCUMENTS 6,836,075 B2 * 12/2004 Park ..................... G09G 3/3225 257/E21.134
7,071,629 B2 * 7/2006 Russ ........................ G09G 3/20 313/495
(Continued)

FOREIGN PATENT DOCUMENTS

KR 10-2010-0012944 A 2/2010
KR 10-2013-0132708 A 12/2013
(Continued)

OTHER PUBLICATIONS

Extended European Search Report dated Sep. 29, 2015 for European Patent Application No. EP 15 177 270.4, which corresponds to captioned U.S. Appl. No. 14/709,814.

*Primary Examiner* — Jason Mandeville
(74) *Attorney, Agent, or Firm* — Knobbe, Martens, Olson & Bear, LLP

(57) ABSTRACT

A display device, system having the same, and pixel are disclosed. In one aspect, the display device includes a display panel including a plurality of pixels and a plurality of wireless power receivers. The display device also includes a wireless power transmitter configured to generate and wirelessly transmit power to the wireless power receivers. Each of the wireless power receivers is configured to wirelessly receive the power from the wireless power transmitter and provide a first power supply voltage to the pixels. The display device further includes a power supply configured to generate an initial power supply voltage and provide the initial power supply voltage to the wireless power transmitter.

19 Claims, 8 Drawing Sheets

(51) Int. Cl.
*G09G 3/20* (2006.01)
*H02J 5/00* (2016.01)

(52) U.S. Cl.
CPC ... *G09G 2300/026* (2013.01); *G09G 2310/08* (2013.01); *G09G 2330/02* (2013.01); *G09G 2330/028* (2013.01)

(58) Field of Classification Search
CPC ....... G09G 2330/021; G09G 2330/023; G09G 2330/024; G09G 2330/028; H02J 5/005
USPC ............................................ 345/211, 212, 76
See application file for complete search history.

(56) References Cited

U.S. PATENT DOCUMENTS

| | | | | |
|---|---|---|---|---|
| 8,244,177 | B2 * | 8/2012 | Zyambo | H02J 5/005 343/895 |
| 2010/0079416 | A1 | 4/2010 | Chung et al. | |
| 2010/0182207 | A1 * | 7/2010 | Miyata | H01L 27/13 343/702 |
| 2010/0315389 | A1 * | 12/2010 | Sorrell | H01Q 1/22 345/204 |
| 2012/0262432 | A1 * | 10/2012 | Kamata | H05B 33/0896 345/204 |

FOREIGN PATENT DOCUMENTS

| | | | |
|---|---|---|---|
| KR | 10-2014-0073416 | A | 6/2014 |
| KR | 10-2014-0087526 | A | 7/2014 |
| WO | WO 2011/127334 | A2 | 10/2011 |

* cited by examiner

100

DISPLAY DEVICE, SYSTEM HAVING THE SAME, AND PIXEL

CROSS REFERENCE TO RELATED APPLICATION

This application claims priority from and the benefit of Korean Patent Applications No. 10-2015-0008469, filed on Jan. 19, 2015 in the Korean Intellectual Property Office (KIPO), the disclosure of which is hereby incorporated by reference herein in its entirety.

BACKGROUND

Field

The described technology generally relates to display devices, systems having the same, and pixels.

Description of the Related Technology

Display devices include a display panel having a plurality of pixels that are arranged in a matrix. The pixels are driven based on received driving voltages. For example, each of the pixels in an organic light-emitting diode (OLED) display includes an OLED. OLEDs generate light via the recombination of holes, which are provided from an anode to which a first power supply voltage (ELVDD) is applied, and electrons, which are provided from a cathode to which a second power supply voltage (ELVSS) is applied, in an organic material layer interposed between the anode and the cathode.

When supplying a power supply voltage across wires, such as power supply lines, a voltage drop (IR-drop) occurs along the wires. When pixels in the display panel receive a lower voltage due to such a voltage drop, it can degrade image quality. Further, the formation of power supply lines decreases the aperture ratio of the pixels. Especially, in medium and large size display panels, IR-drop data distortion along the power lines can have a negative effect on image quality, requiring the compensation of data voltages based on pixel location. As a result, display panel construction may be complicated to compensate the data voltages and the aperture ratio may be relatively low. In addition, data voltage compensation techniques do not perfectly compensate IR-drop data distortion.

SUMMARY OF CERTAIN INVENTIVE ASPECTS

One inventive aspect is a display device having a wireless power transmitter circuit and a wireless power receiver circuit.

Another aspect is a system including the display device.

Another aspect is a pixel that can wirelessly receive a power supply voltage.

Another aspect is a display device comprising a wireless power transmitter circuit configured to transmit a power to a plurality of wireless power receiver circuits wirelessly, a display panel including a plurality of pixels, and the plurality of wireless power receiver circuits configured to wirelessly receive the power from the wireless power transmitter circuit and to provide a first power supply voltage to the pixels based on the received power, a power supply configured to generate the first power supply voltage and to provide the first power supply voltage to the wireless power transmitter circuit, a display panel driver configured to drive the display panel, and a timing controller configured to control the display panel driver.

In exemplary embodiments, the wireless power receiver circuits can be formed in a thin film that is formed under the pixels.

In exemplary embodiments, each of the wireless power receiver circuits can be connected to at least two of the pixels.

In exemplary embodiments, each of the wireless power receiver circuits can be connected to N by N pixels that are arranged in a matrix form, where N is a positive integer.

In exemplary embodiments, the number of the wireless power receiver circuits can correspond to about $1/N^2$.

In exemplary embodiments, the power supply can further generate a second power supply voltage and provide the second power supply voltage to the pixels via a common power supply line.

In exemplary embodiments, the first power supply voltage can be greater than the second power supply voltage.

In exemplary embodiments, the wireless power receiver circuits can receive the power through a mutual resonance with the wireless power transmitter circuit based on a resonant frequency.

In exemplary embodiments, each of the wireless power receiver circuits can include a power receiver configured to receive an alternating current (AC) power through the mutual resonance with the wireless power transmitter circuit, a matcher configured to match an output impedance of the power receiver and an input impedance of a rectifier, and the rectifier configured to convert the AC power, received via the matcher, into the first power supply voltage, which is a direct current (DC) voltage.

In exemplary embodiments, the wireless power transmitter circuit can include an oscillator configured to oscillate the first power supply voltage provided from the power supply, and a power transmitter configured to transmit the AC power corresponding to the first power supply voltage to the wireless power receiver circuits through the mutual resonance with the wireless power receiver circuits based on an output of the oscillator and the resonant frequency.

In exemplary embodiments, the power transmitter can be included in a conductive film that is arranged on the display panel, and wherein the power transmitter includes a resonant coil.

In exemplary embodiments, the oscillator can be included in the power supply.

In exemplary embodiments, the wireless power receiver circuits can wirelessly receive the power from the wireless power transmitter circuit through electromagnetic induction.

Another aspect is a system comprising a storage device configured to store image data, a display device configured to display the image data, and a processor configured to control the storage device and the display device. The display device can include a wireless power transmitter circuit configured to transmit a power to a plurality of wireless power receiver circuits wirelessly, a display panel including the plurality of wireless power receiver circuits configured to receive the power from the wireless power transmitter circuit and to provide a first power supply voltage to a plurality of pixels based on the received power, a power supply configured to generate the first power supply voltage and to provide the first power supply voltage to the wireless power transmitter circuit, a display panel driver configured to drive the display panel, and a timing controller configured to control the display panel driver.

In exemplary embodiments, the wireless power receiver circuits can be formed in a thin film that is formed under the pixels. Each of the wireless power receiver circuits can be connected to N by N pixels that are arranged in a matrix form, where N is a positive integer.

Another aspect is a pixel comprising an OLED, a wireless power receiver circuit configured to receive a power from an external wireless power transmitter circuit wirelessly and to provide a power supply voltage to a driving transistor based on the received power, the driving transistor including a gate electrode connected to a second electrode of a switching transistor, a first electrode to which the power supply voltage is applied from the wireless power receiver circuit, and a second electrode connected to a cathode of the OLED, the switching transistor including a gate electrode to which a scan signal is applied, a first electrode to which a data signal is applied, and a second electrode connected to the gate electrode of the driving transistor, and a storage capacitor including a first electrode connected to the gate electrode of the driving transistor and a second electrode connected to the first electrode of the driving transistor.

In exemplary embodiments, the wireless power receiver circuit can be formed in a thin film that is formed under the driving transistor and the switching transistor.

In exemplary embodiments, the wireless power receiver circuit can receive the power through a mutual resonance with the wireless power transmitter circuit based on a resonant frequency.

In exemplary embodiments, the wireless power receiver circuit can include a power receiver configured to receive an alternating current (AC) power through the mutual resonance with the wireless power transmitter circuit, a matcher configured to match an output impedance of the power receiver and an input impedance of a rectifier, and the rectifier configured to convert the AC power, received via the matcher, into the first power supply voltage, which is a direct current (DC) voltage.

In exemplary embodiments, the wireless power receiver circuit can wirelessly receive the power from the wireless power transmitter circuit through electromagnetic induction.

Another aspect is a display device, comprising a display panel including a plurality of pixels and a plurality of wireless power receivers; a wireless power transmitter configured to: i) generate power based on an initial power supply voltage and ii) wirelessly transmit the generated power to the wireless power receivers, wherein each of the wireless power receivers is configured to: i) wirelessly receive the power from the wireless power transmitter, ii) convert the received power into a first power supply voltage, and iii) provide the first power supply voltage to the pixels; a power supply configured to: i) generate the initial power supply voltage and ii) provide the initial power supply voltage to the wireless power transmitter; a display panel driver configured to drive the display panel; and a timing controller configured to control the display panel driver.

In exemplary embodiments, the display panel further comprises a substrate on which the pixels are formed, wherein the wireless power receivers are formed in a thin film that is interposed between the pixels and the substrate. Each of the wireless power receivers can be connected to at least two of the pixels. Each of the wireless power receivers can be connected to a subset of the pixels that are arranged in an N by N matrix, where N is a positive integer. The number of the wireless power receivers can correspond to about $1/N^2$. The power supply can be further configured to generate a second power supply voltage and provide the second power supply voltage to the pixels via a common power supply line.

In exemplary embodiments, the first power supply voltage is greater than the second power supply voltage. Each of the wireless power receivers can be further configured to receive the power through a mutual resonance with the wireless power transmitter. Each of the wireless power receivers can include a power receiver configured to receive alternating current (AC) power from the wireless power transmitter; a rectifier configured to convert the AC power into the first power supply voltage, wherein the first power supply voltage is a direct current (DC) voltage; and an impedance matcher configured to match the output impedance of the power receiver and the input impedance of the rectifier.

In exemplary embodiments, the wireless power transmitter includes an oscillator configured to generate the AC power via oscillating the initial power supply voltage received from the power supply; and a power transmitter configured to transmit the AC power to the wireless power receivers. The power transmitter can be included in a conductive film that is arranged on the display panel, and wherein the power transmitter includes a resonant coil. The oscillator can be included in the power supply. Each of the wireless power receivers can be further configured to wirelessly receive the power from the wireless power transmitter through electromagnetic induction.

Another aspect is a system comprising a storage device configured to store image data; a display configured to display the image data; and a processor configured to control the storage device and the display, wherein the display includes: a display panel including a plurality of pixels and a plurality of wireless power receivers; a wireless power transmitter configured to: i) generate power based on an initial power supply voltage and ii) wirelessly transmit the generated power to the wireless power receivers, wherein each of the wireless power receivers is configured to: i) receive the power from the wireless power transmitter ii) convert the received power into a first power supply voltage, and iii) provide the first power supply voltage to the pixels; a power supply configured to: i) generate the initial power supply voltage and ii) provide the initial power supply voltage to the wireless power transmitter; a display panel driver configured to drive the display panel; and a timing controller configured to control the display panel driver.

In exemplary embodiments, the display panel further comprises a substrate on which the pixels are formed, wherein each of the wireless power receivers is formed in a thin film that is interposed between the pixels and the substrate, and wherein each of the wireless power receivers is connected a subset of the pixels that are arranged in an N by N matrix, where N is a positive integer.

Another aspect is a pixel, comprising an organic light-emitting diode (OLED); a switching transistor including: i) a gate electrode configured to receive a scan signal, ii) a first electrode configured to receive a data signal, and iii) a second electrode; a driving transistor configured to supply a driving current to the OLED, wherein the driving transistor includes: i) a gate electrode connected to the second electrode of the switching transistor, ii) a first electrode configured to receive a power supply voltage, and iii) a second electrode connected to the OLED; a wireless power receiver configured to: i) wirelessly receive power from an external wireless power transmitter, ii) convert the received power into the power supply voltage, and iii) provide the power supply voltage to the driving transistor; and a storage capacitor including: i) a first electrode connected to the gate electrode of the driving transistor and ii) a second electrode connected to the first electrode of the driving transistor.

In exemplary embodiments, the pixel is formed on a substrate and wherein the wireless power receiver is formed in a thin film that is interposed between: i) the substrate and ii) the driving transistor and the switching transistor. The wireless power receiver can be further configured to receive the power through a mutual resonance with the wireless power transmitter. The wireless power receiver can include a power receiver configured to receive alternating current (AC) power; a rectifier configured to convert the AC power into the power supply voltage, wherein the power supply voltage is a direct current (DC) voltage; and an impedance matcher configured to match an output impedance of the power receiver and the input impedance of a rectifier. The wireless power receiver can be further configured to wirelessly receive the power from the wireless power transmitter through electromagnetic induction.

Therefore, according to at least one embodiment, the pixel, the display device and the system include the plurality of wireless power receiver circuits connected to the pixels and the wireless power transmitter circuit configured to wirelessly transmit the power supply voltage (e.g., the first power supply voltage ELVDD and/or the second power supply voltage ELVSS) to the wireless power receiver circuits, so that the power supply lines for transmitting the power supply voltage can be omitted. Thus, the voltage drop (IR-drop) across the power supply lines does not occur, so that the display device can prevent a distortion of image quality in accordance with the IR-drop beforehand. Further, the power supply lines for transmitting the power supply voltage are omitted so that aperture ratio can increase.

BRIEF DESCRIPTION OF THE DRAWINGS

Exemplary embodiments will be described in greater detail in the following description taken in conjunction with the accompanying drawings, in which.

DETAILED DESCRIPTION OF CERTAIN INVENTIVE EMBODIMENTS

Exemplary embodiments will be described more fully hereinafter with reference to the accompanying drawings, in which various embodiments are shown.

Figure 1:
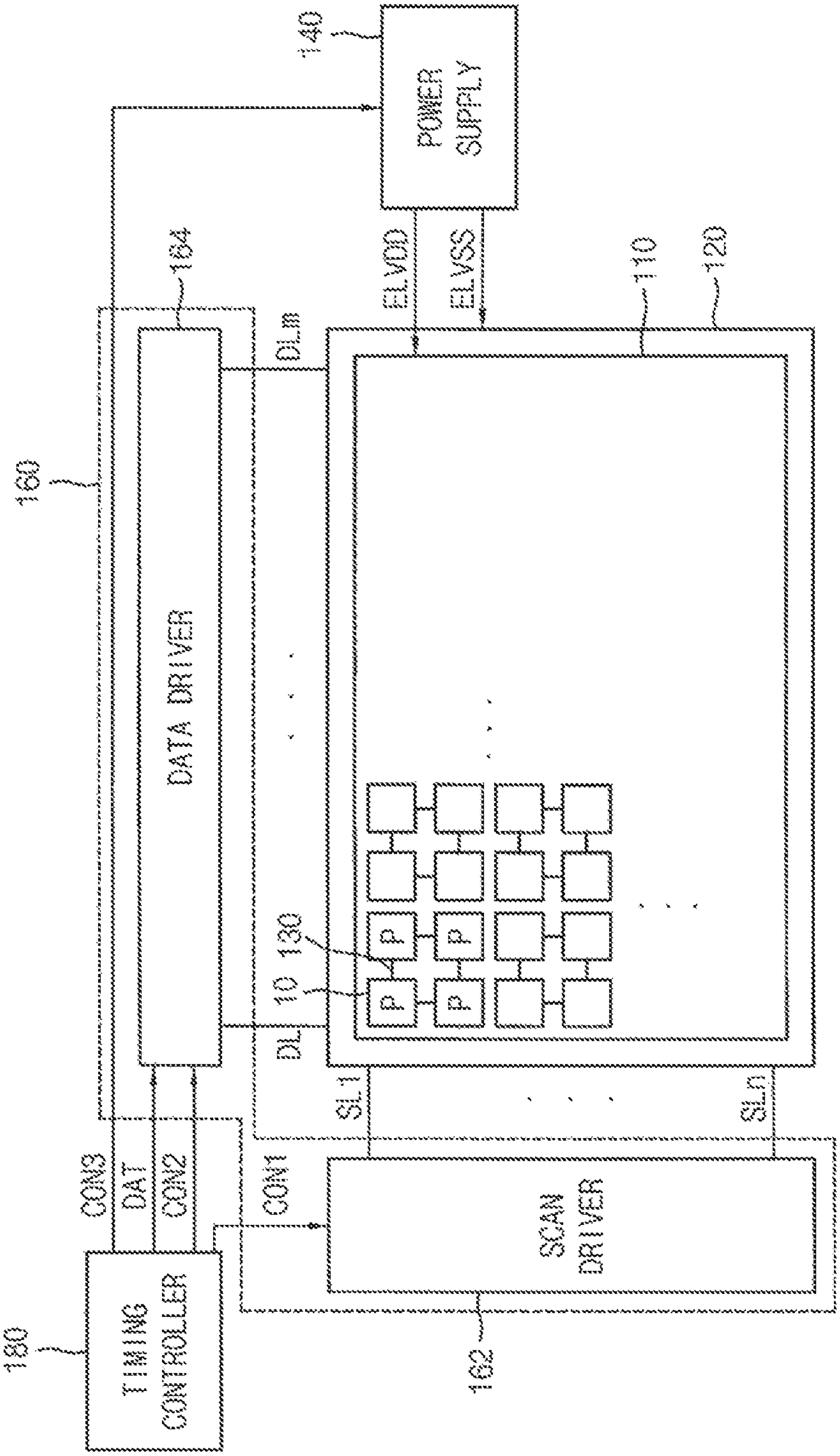
FIG. 1 is a block diagram of a display device according to exemplary embodiments.

FIG. 1 is a block diagram of a display device according to exemplary embodiments.

Referring to FIG. 1, the display device 100 includes a wireless power transmitter circuit or wireless power transmitter 110, a display panel 120, a power supply 140, a display panel driver 160, and a timing controller 180. The display device 100 can be implemented using one of various kinds of display panel in so far as the display panel 120 displays an image corresponding to a data signal.

The wireless power transmitter circuit 110 can wirelessly transmit a power to a plurality of wireless power receiver circuits or wireless power receivers 130. The wireless power transmitter circuit 110 can receive the power from the power supply 140. The received power may be an alternating current (AC) power or a direct current (DC) power. For example, the power may correspond to a first power supply voltage ELVDD that is supplied to the display panel 120. The power can be the AC power corresponding to the first power supply voltage ELVDD. In some embodiments, the wireless power transmitter circuit 110 is included in a conductive film that is arranged on the display panel 120. The wireless power transmitter circuit 110 can include a resonant coil. For example, the resonant coil can include conductive material arranged in a polarizer that is formed on the display panel 120.

In some embodiments, the wireless power transmitter circuit 110 includes an oscillator configured to oscillate the first power supply voltage ELVDD provided from the power supply and a power transmitter configured to transmit an AC power corresponding to the first power supply voltage ELVDD to the wireless power receiver circuits 130 through mutual resonance with the wireless power receiver circuits 130 based on an output of the oscillator and a resonant frequency. The oscillator can be included in the power supply 140 and the power transmitter can be formed on the polarizer.

The display panel 120 includes a plurality of pixels 10. The display panel 120 can include the wireless power receiver circuits 130 configured to receive the power from the wireless power transmitter circuit 110 and to provide the first power supply voltage ELVDD to the pixels 10 based on the received power. The pixels 10 are connected to a plurality of data lines DL1 through DLm and a plurality of scan lines SL1 through SLn. The pixels can receive data signals via the data lines DL1 through DLm. The pixels can receive scan signals via the scan lines SL1 through SLn. Each of the pixels may include an OLED.

The wireless power receiver circuits 130 can be formed under the pixels 10 in a manufacturing process of the display device 100. For example, the wireless power receiver circuits 130 can be formed between a substrate on which a driving transistor (and a switching transistor) of the pixel 10 is formed and the driving transistor. In some embodiments, each of the wireless power receiver circuits 130 is connected to at least two of the pixels 10. For example, as illustrated in FIG. 1, each of the wireless power receiver circuits 130 can be connected a pixel group that has at least two of the pixels 10 arranged in 2 by 2 matrix. Thus, each of the wireless power receiver circuits 130 can supply the first power supply voltage ELVDD to four pixels 10. In some embodiments, the number of the wireless power receiver circuits 130 corresponds to about $1/N^2$, where N is a positive integer. For example, the total number of pixels 10 can be about quadruple the number of the wireless power receiver circuits 130 when each of the wireless power receiver circuits 130 is connected to a group of pixels 10 arranged in a 2 by 2 matrix.

In some embodiments, each of the wireless power receiver circuits 130 includes a power receiver configured to receive the AC power through the mutual resonance with the wireless power transmitter circuit 110, a matcher or impedance matcher, and a rectifier configured to convert the AC power, received via the matcher, into the first power supply voltage ELVDD, that is a DC voltage.

Since this is an example, the power transmitted through the wireless power transmitter/receiver circuits 110 and 130 is not limited thereto. For example, the wireless power receiver circuits 130 can receive a power corresponding to the second power supply voltage ELVSS from the wireless power transmitter circuit 110.

In one example embodiment, the wireless power receiver circuits 130 receive the power through a mutual resonance with the wireless power transmitter circuit 110 based on a resonant frequency. In another example embodiment, the wireless power receiver circuits 130 wirelessly receive the power from the wireless power transmitter circuit 110 through electromagnetic induction. Since these are examples, the methods for wirelessly receiving the power are not limited thereto. For example, the wireless power receiver circuits 130 can receive the power though a wireless power transfer method using microwaves.

The power supply 140 can generate the first and second power supply voltages ELVDD and ELVSS. The power supply 140 can provide the first power supply voltage ELVDD to the wireless power transmitter circuit 110. The power supply 140 can provide the second power supply voltage ELVSS to the pixels 10. The first power supply voltage ELVDD may be greater than the second power supply voltage ELVSS. For example, the first power supply voltage ELVDD may be a positive voltage and the second power supply voltage ELVSS may be a negative voltage or a ground voltage. Here, the first power supply voltage ELVDD is wirelessly supplied to the pixels 10 such that power supply lines for transmitting the first power supply voltage ELVDD to the pixels can be omitted. In some embodiments, the power supply 140 supplies the second power supply voltage ELVSS to the pixels 10 via a common power supply lines.

The display panel driver 160 can drive the display panel 120. In the FIG. 1 embodiment, the display panel driver 160 includes a scan driver 162 and a data driver 164.

The scan driver 162 can respectively provide a plurality of scan signals to the display panel 120 via the scan lines SL1 to SLn. The scan driver 162 can sequentially provide the scan signals to the scan lines SL1 to SLn based on a first control signal CONT1 received from the timing controller 180.

The data driver 164 can provide a plurality of data signals to the display panel 120 via the data lines DL1 to DLm. The data driver 164 can provide the data signals to the data lines DL1 to DLm based on a second control signal CONT2 and an output image signal DAT received from the timing controller 180.

The timing controller 180 can control the display panel driver 160. The timing controller 180 may receive a red, green, and blue (RGB) image signal, a vertical synchronization signal, a horizontal synchronization signal, a main clock signal, and a data enable signal from an external graphic controller (not illustrated), and can generate the output image signal DAT, the first control signal CON1, the second control signal CON2, and a third control signal CON3. The timing controller 180 can provide the first control signal CON1 to the scan driver 162, the second control signal CON2 and the output image signal DAT to the data driver 164, and the third control signal CON3 to the power supply 140. For example, the first control signal CON1 may include a vertical synchronization start signal, which controls the start of outputting the scan signal, a scan clock signal, which controls the output timing of the scan signal, and an output enable signal, which controls the duration of the scan signal. The second control signal CON2 may include a horizontal synchronization start signal, which controls the start of outputting the data signal, a data clock signal, which controls the output timing of the data signal, and a load signal. The third control signal CON3 can control the start of driving the power supply 140.

As described above, the display device according to exemplary embodiments includes the wireless power receiver circuits 130 connected to the pixels 10 and the wireless power transmitter circuit 110 configured to wirelessly transmit the power supply voltage to the wireless power receiver circuits 130, so that power supply lines for transmitting the power supply voltage can be omitted. Thus, the voltage drop (IR-drop) across the power supply lines does not occur, so that the display device 100 can prevent image quality distortions that would otherwise occur due to an IR-drop. Further, by omitting the power supply lines for transmitting the power supply voltage the aperture ratio can be increased.

Figure 2:
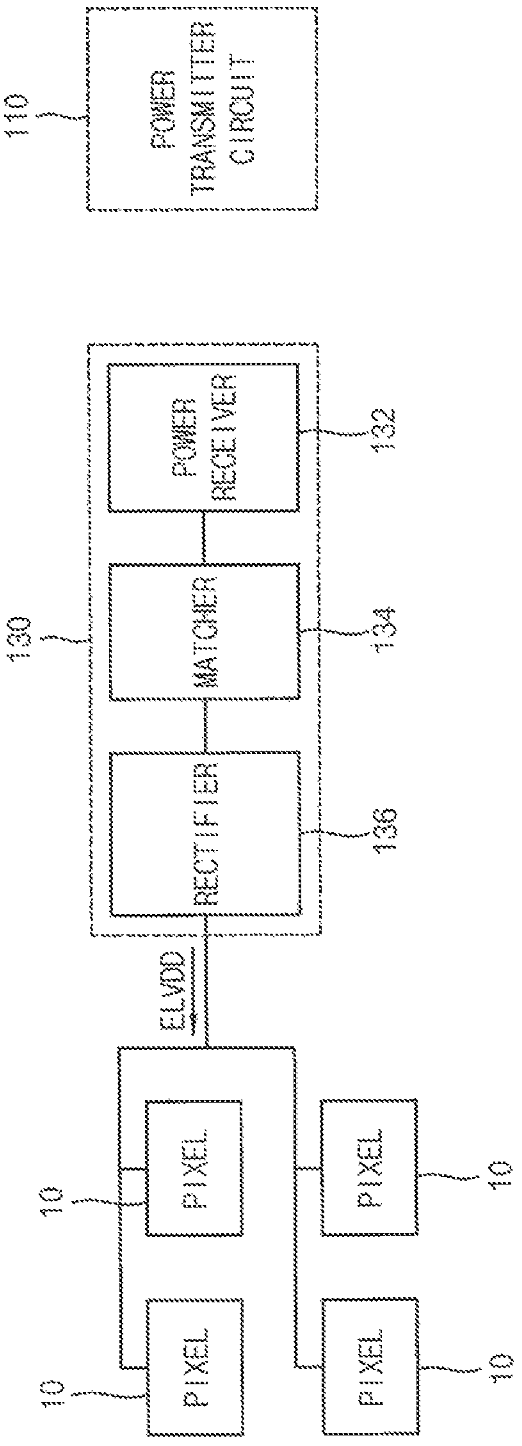
FIG. 2 is a block diagram illustrating an example of a wireless power receiver circuit that is connected to a plurality of pixels included in the display device of FIG. 1.

FIG. 2 is a block diagram illustrating an example of a wireless power receiver circuit that is connected to a plurality of pixels included in the display device of FIG. 1.

Referring to FIG. 2, the wireless power receiver circuit 130 includes the power receiver 132, the matcher 134, and the rectifier 136. The wireless power receiver circuit 130 can be connected to N by N pixels 10 that are arranged in a matrix. For example, as illustrated in FIG. 2, the wireless power receiver circuit 130 can be connected to pixel 10 arranged in a 2 by 2 matrix.

In some embodiments, the power receiver 132 can wirelessly receive the power through a mutual resonance with the wireless power transmitter circuit 110 based on a resonant frequency. The power receiver 132 can include a resonator. When the resonant frequency of the power receiver 132 matches the resonant frequency of the power transmitter of the wireless power transmitter circuit 110, the power can be transferred from the power transmitter to the power receiver 132 through the mutual resonance. In some embodiments, the power receiver 132 has a micro receiving antenna structure. The micro receiving antenna structure can correspond to micro strip lines.

The matcher 134 can connect a passive element (e.g., an inductor and/or a capacitor) to the rectifier 136 in series and/or in parallel in order to match the input impedance of the rectifier 136 to the output impedance of the power receiver 132. The matcher 134 can be formed in a thin film.

The rectifier 136 can convert the AC power, received via the matcher 134, into the first power supply voltage ELVDD, which is a direct current (DC) voltage. The first power supply voltage ELVDD can be applied to the pixels 10 that are connected to the wireless power receiver circuit 130. In some embodiments, the rectifier 136 includes a bridge diode and a capacitor. The rectifier 136 can be formed in the thin film. In some embodiments, the wireless power receiver circuit 130 further includes a DC/DC converter to convert the DC voltage that is received from the rectifier 136 into a DC voltage (e.g., the first power supply voltage ELVDD) required for driving the pixels 10. The DC/DC converter may step up or down the DC voltage that is received from the rectifier 136 to the DC voltage required for driving the pixels 10.

In some embodiments, the wireless power receiver circuit 130 is formed in the thin film that is arranged under the pixels 10. Thus, extra space is not required for wireless power transmission.

As described above, the display panel 120 can include the wireless power receiver circuit 130 so that the first power supply voltage ELVDD can be wirelessly supplied to the pixels 10.

Figure 3A:
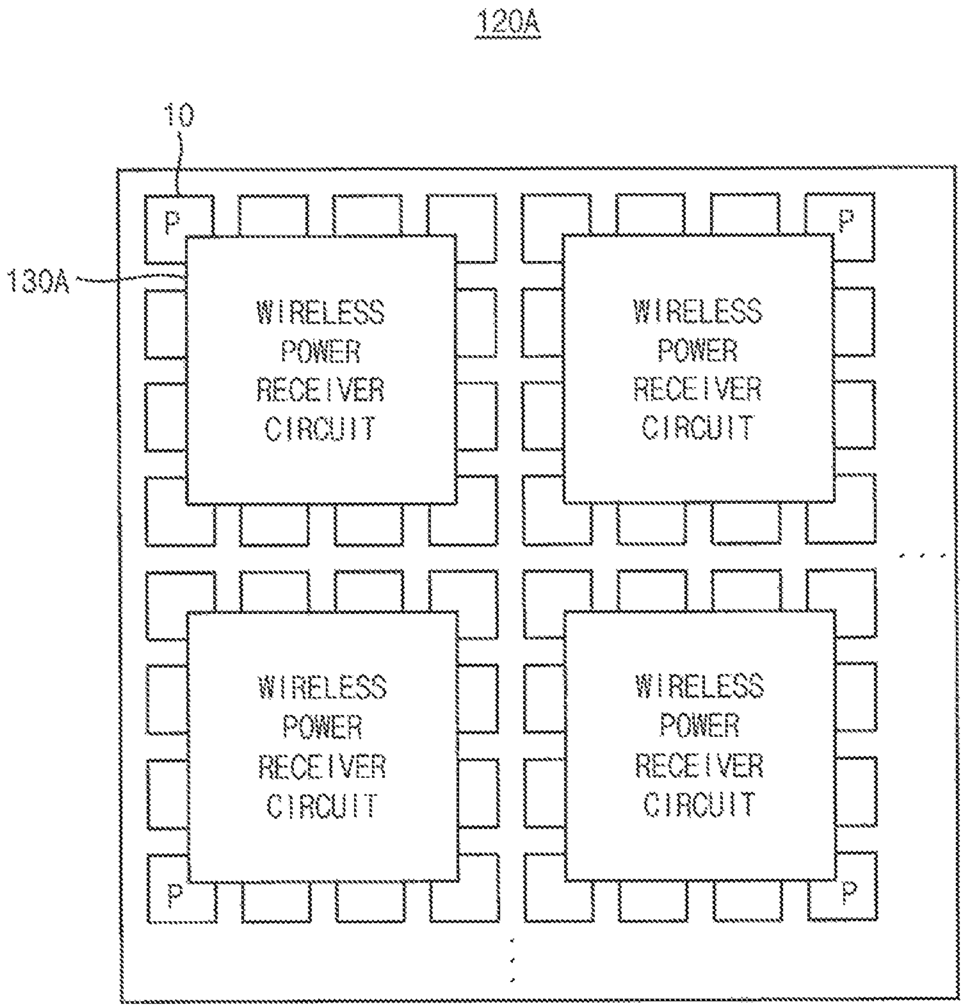
FIG. 3A is a diagram illustrating an example of a portion of a display panel included in the display device of FIG. 1.
Figure 3B:
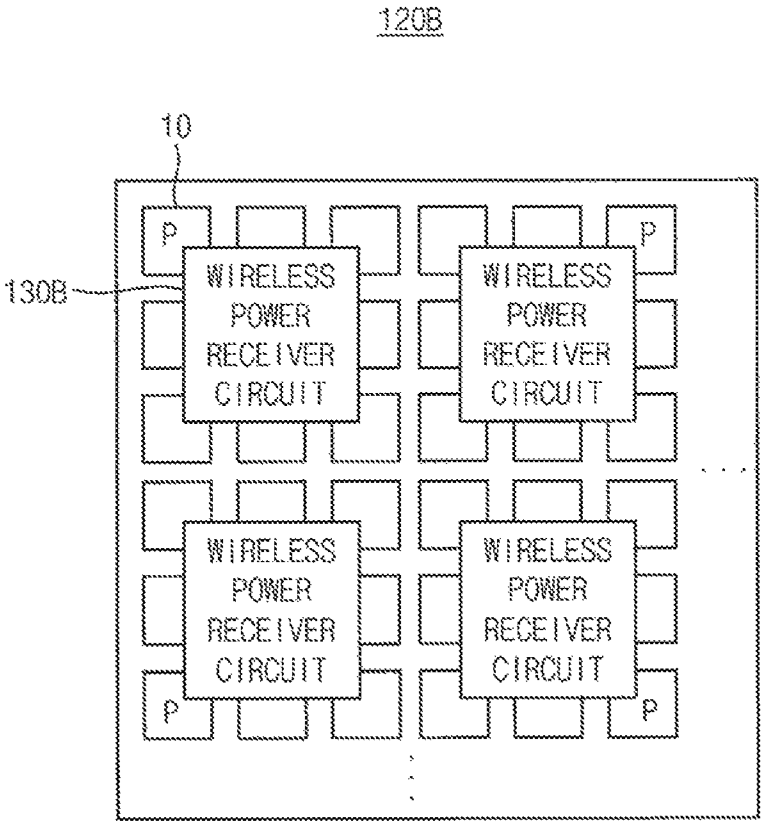
FIG. 3B is a diagram illustrating another example of a portion of a display panel included in the display device of FIG. 1.

FIG. 3A is a diagram illustrating an example of a portion of a display panel included in the display device of FIG. 1. FIG. 3B is a diagram illustrating another example of a portion of a display panel included in the display device of FIG. 1.

Referring to FIGS. 3A and 3B, the wireless power receiver circuit 130A and 130B is connected to a plurality of pixels 10. In some embodiments, the wireless power receiver circuit 130A and 130B is formed in a thin film that is arranged under the pixels 10. For example, the wireless power receiver circuits 130A and 130B can be formed between a substrate on which a driving transistor (and a switching transistor) of the pixel 10 is formed and the driving transistor. In some embodiments, each wireless power receiver circuit 130A and 130B is connected to N by N pixels that are arranged in a matrix, where N is a positive integer. Thus, the number of the wireless power receiver circuits may correspond to about $1/N^2$.

For example, as illustrate in FIG. 3A, the wireless power receiver circuit 130A is connected to 4 by 4 pixels (i.e. 16 pixels). The wireless power receiver circuit 130A supplies the first power supply voltage ELVDD to the 16 pixels. In some embodiments employing this configuration, the number of wireless power receiver circuits 130A is 1920×1080/16 (=129600) when the total number of pixels in the display panel 120A is 1920×1080.

In another example, as illustrate in FIG. 3B, the wireless power receiver circuit 130B is connected to 3 by 3 pixels (i.e. 9 pixels). The wireless power receiver circuit 130B supplies the first power supply voltage ELVDD to the 9 pixels. In some embodiments employing this configuration, the number of wireless power receiver circuits 130B is 1920×1080/9 (=230400) when total number of pixels in the display panel 120A is 1920×1080.

As described above, the wireless power receiver circuit 130A and 130B is formed on (or under) the pixels 10 of the display panel 120A and 120B and can supply the power supply voltage (e.g., the first power supply voltage ELVDD) to the pixels. Thus, the wireless power receiver circuits can be efficiently arranged on the display panel.

In example embodiments, the power transmitter in the wireless power transmitter circuit 110 is formed on (or under) the display panel 120A and 120B. The power transmitter can be formed in a conductive film to have the resonant coil.

Figure 4:
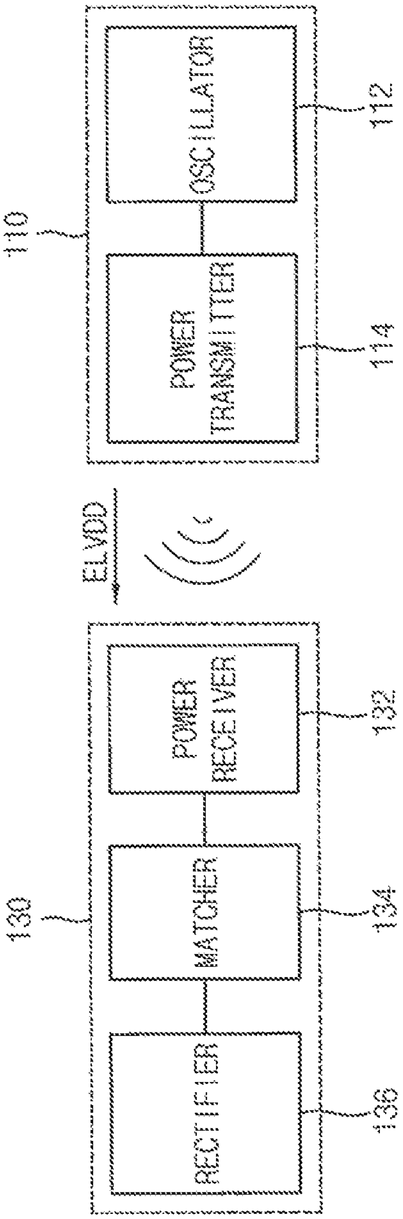
FIG. 4 is a block diagram illustrating an example of a wireless power transmitter circuit and a wireless power receiver circuit that are included in the display device of FIG. 1.

FIG. 4 is a block diagram illustrating an example of a wireless power transmitter circuit and a wireless power receiver circuit that are included in the display device of FIG. 1.

Referring to FIG. 4, the wireless power transmitter circuit 110 includes the oscillator 112 and the power transmitter 124. The wireless power receiver circuit 130 includes the power receiver 132, the matcher 134, and the rectifier 136. The wireless power receiver circuit 130 can wirelessly receive the AC voltage corresponding to the first power supply voltage ELVDD from the wireless power transmitter circuit 110.

In some embodiments, the wireless power receiver circuit 130 receives the power (e.g., the first power supply voltage ELVDD) through a mutual resonance with the wireless power transmitter circuit 110 based on a resonant frequency. In another example embodiment, the wireless power receiver circuits 130 wirelessly receives the power from the wireless power transmitter circuit 110 through electromagnetic induction. Since these are examples, methods for wirelessly receiving the power are not limited thereto. For example, the wireless power receiver circuits 130 may receive the power though a wireless power transfer method using microwaves.

In some embodiments, the wireless power transmitter circuit 110 includes the oscillator 112 and the power transmitter 114.

The oscillator 112 can oscillate the first power supply voltage ELVDD provided from the power supply 140. In some embodiments, the oscillator 112 can generate power at a power transfer frequency (e.g., the resonant frequency) and amplify the AC voltage that is provided from the power supply 140. The power transfer frequency may be generated by a frequency generator that is generally used in field of radio frequency (RF) communications. The oscillator 112 can amplify the amplitude of the AC power in consideration of energy transmission efficiency. In some embodiments, the oscillator 112 further includes an AC/DC converter configured to convert the AC voltage that is applied from the power supply 140 into a DC voltage. The AC/DC converter may operate as an analog to digital converter (ADC).

The power transmitter 114 can transmit the AC power corresponding to the first power supply voltage ELVDD to the wireless power receiver circuit 130 through the mutual resonance with the wireless power receiver circuit 130 based on an output of the oscillator 112 and the resonant frequency. The power transmitter 114 can include a resonator.

The wireless power receiver circuit 130 includes the power receiver 132, the matcher 134, and a rectifier 136.

The power receiver 132 can wirelessly receive the power through the mutual resonance with the wireless power transmitter circuit 110 based on the resonant frequency. The power receiver 132 can include a resonator. When the resonant frequency of the power receiver 132 matches the resonant frequency of the power transmitter of the wireless power transmitter circuit 110, the power can be transferred from the power transmitter to the power receiver 132 through the mutual resonance. The rectifier 136 can convert the AC power, received via the matcher 134, into the first power supply voltage ELVDD, which is a DC voltage.

Since the wireless power receiver circuit 130 is described above referred to FIGS. 1 through 3B, duplicate descriptions thereof will not be repeated.

Figure 5:
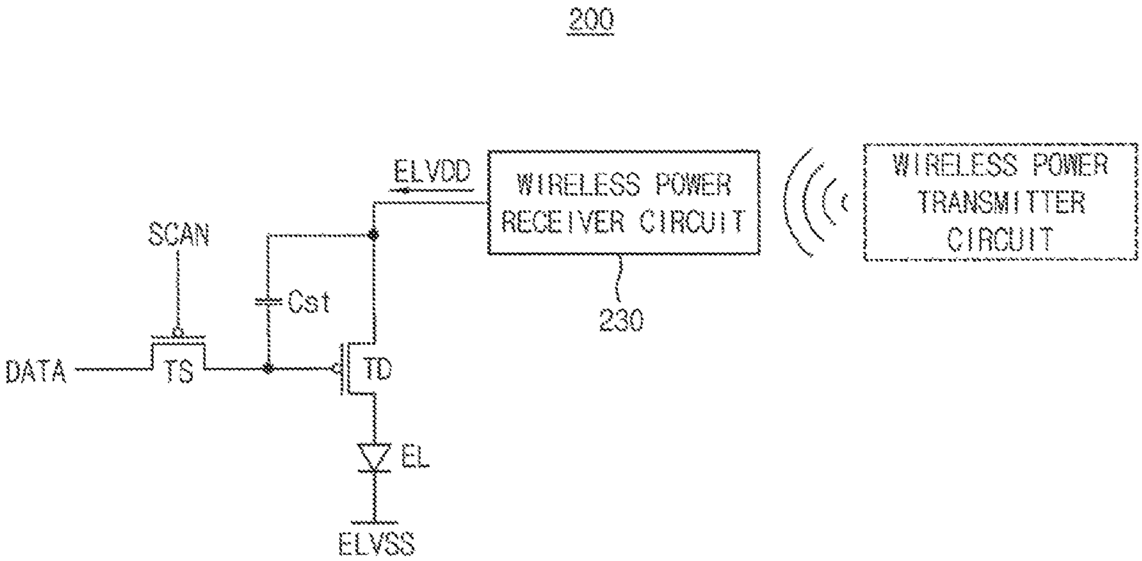
FIG. 5 is a diagram of a pixel according to exemplary embodiments.

FIG. 5 is a diagram of a pixel according to exemplary embodiments.

Referring to FIG. 5, the pixel 200 includes an OLED EL, a wireless power receiver circuit 230, a driving transistor TD, a switching transistor TS, and a storage capacitor Cst.

The OLED EL includes a cathode to which a second power supply voltage ELVSS is applied and an anode connected to a second electrode of the driving transistor TD. In some embodiments, the second power supply voltage ELVSS is supplied to the OLED EL via a common power supply line.

The switching transistor TS includes a gate electrode to which a scan signal is applied, a first electrode to which a data signal DATA is applied, and a second electrode connected to a gate electrode of the driving transistor TD. The switching transistor TS can be turned on by the scan signal which is applied through a scan line such that the switching transistor TS can provide the data signal DATA to a first node N1.

The storage capacitor Cst includes a first electrode connected to the gate electrode of the driving transistor and a second electrode connected to the first electrode of the driving transistor. In some embodiments, the storage capacitor Cst stores a voltage corresponding to the data signal DATA.

The driving transistor TD includes the gate electrode connected to the second electrode of the switching transistor TS, the first electrode to which the first power supply voltage ELVDD is applied from the wireless power receiver circuit 230, and the second electrode connected to a cathode of the OLED EL. The driving transistor TD can be turned on by a voltage from the storage capacitor Cst or the switching transistor TS such that a driving current corresponding to the data signal DATA flows into the OLED EL. The driving current can flow from a first power supply voltage terminal into a second power supply voltage terminal via the driving transistor TD and the OLED EL. The OLED EL can emit light according to the driving current.

The wireless power receiver circuit 230 can wirelessly receive power from an external wireless power transmitter circuit and provide the first power supply voltage ELVDD to the driving transistor TD based on the received power. In some embodiments, the wireless power receiver circuit 230 is formed in a thin film that is arranged under the driving transistor TD and the switching transistor TS. In some embodiments, the wireless power receiver circuit 230 receives the power through a mutual resonance with the wireless power transmitter circuit based on a resonant frequency. In some embodiments employing this configuration, the wireless power receiver circuit 230 includes a power receiver, a matcher, and a rectifier. In some embodiments, the wireless power receiver circuit 230 wirelessly receives the power from the wireless power transmitter circuit through electromagnetic induction. Since the operation and configuration of the wireless power receiver circuit 230 are described above referred to FIGS. 1 through 3B, duplicate descriptions thereof will not be repeated.

As described above, the pixel 200 can include the wireless power receiver circuit 230 so that the first power supply voltage ELVDD can be applied to the pixel 200 wirelessly. However, the structure of the pixel 200 is not limited thereto. For example, the pixel 200 can further include a compensation circuit for compensating a gate voltage of the driving transistor TD, an initialization circuit for initializing the driving transistor TD (or the OLED EL), and/or a switching transistor for controlling emission of the pixel 200 based on an emission signal.

Figure 6:
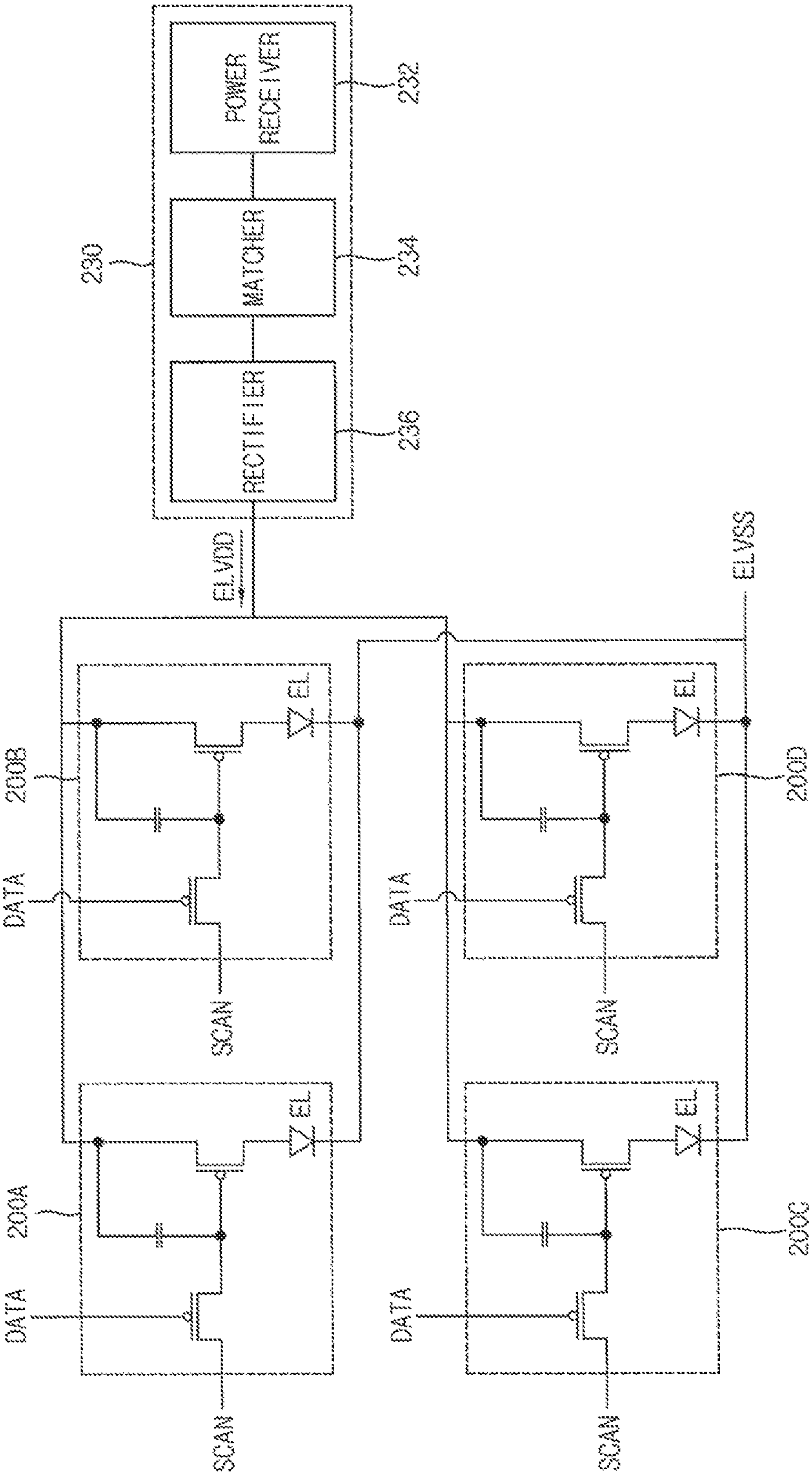
FIG. 6 is a diagram illustrating an example of a wireless power receiver circuit included in the pixel of FIG. 5.

FIG. 6 is a diagram illustrating an example of a wireless power receiver circuit included in the pixel of FIG. 5.

Referring to FIG. 6, the wireless power receiver circuit 230 is connected to pixels 200A, 200B, 200C, and 200D arranged in an N by N matrix. For example, the wireless power receiver circuit 230 can be connected to 2 by 2 pixels 200A, 200B, 200C, and 200D.

In some embodiments, the wireless power receiver circuit 230 receives the power (e.g., the first power supply voltage ELVDD) through a mutual resonance with the wireless power transmitter circuit based on a resonant frequency. The wireless power receiver circuit 230 can convert the power into the first power supply voltage ELVDD that is a DC voltage and supply the first power supply voltage ELVDD to the pixels 200A, 200B, 200C, and 200D. The wireless power receiver circuit 230 can include the power receiver 232 configured to receive an AC power through the mutual resonance with the wireless power transmitter circuit, the matcher 234 configured to match an output impedance of the power receiver 232 and an input impedance of the rectifier 236, and the rectifier 236 configured to convert the AC power, received via the matcher 134, into the first power supply voltage ELVDD, which is the DC voltage.

As illustrated in the FIG. 6 embodiment, the wireless power receiver circuit 230 is commonly connected to a plurality of pixels 200A, 200B, 200C, and 200D. Thus, the wireless power receiver circuit 230 can supply the first power supply voltage ELVDD to the pixels 200A, 200B, 200C, and 200D.

Figure 7:
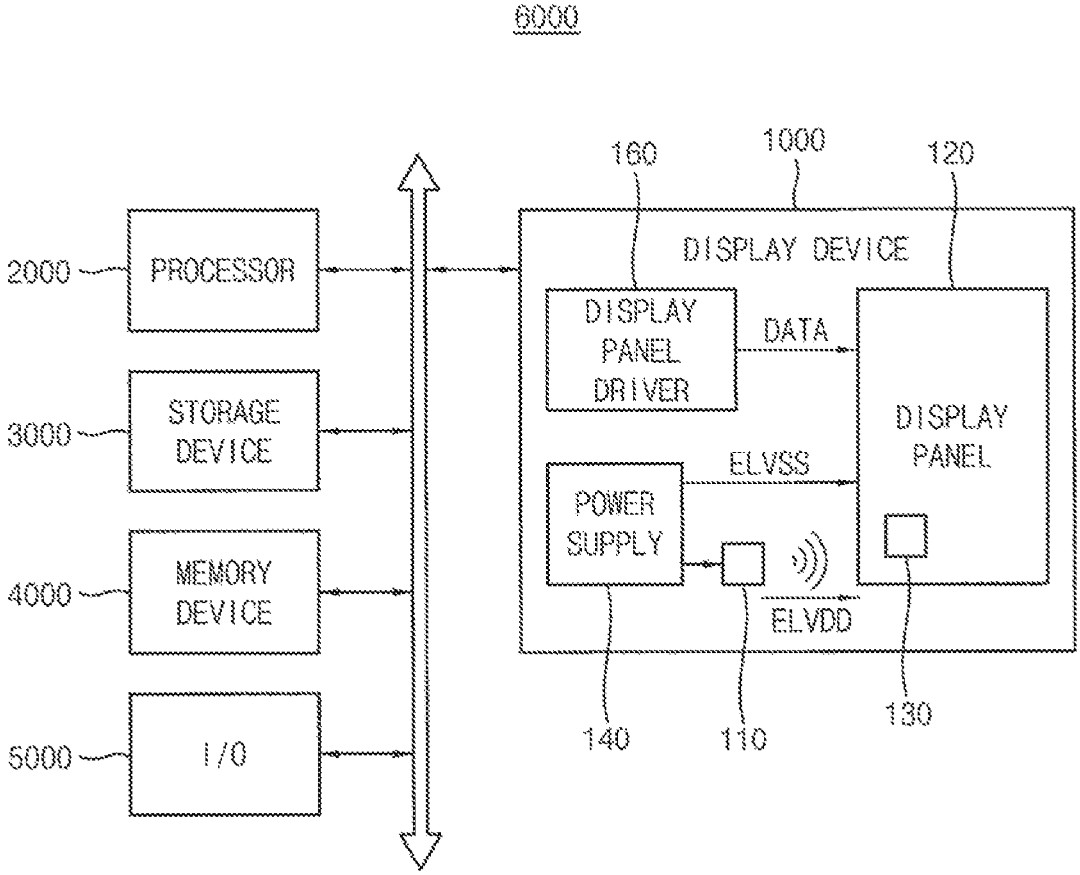
FIG. 7 is a block diagram of a system according to exemplary embodiments.

FIG. 7 is a block diagram of a system according to exemplary embodiments.

Referring to FIG. 7, the system 6000 includes the display device 1000, a processor 2000, and a storage device 3000. The system 6000 further includes a memory device or memory 4000 and an input/output (I/O) device 5000. The display device 1000 includes the display panel 120, the power supply 140, and the display panel driver 160.

The display device 1000 can display the image data stored in the storage device 3000. The display device 1000 includes a wireless power transmitter circuit 110, a display panel 120 including a plurality of wireless power receiver circuits 130, a power supply 140, a display panel driver 160, and a timing controller. The wireless power transmitter circuit 110 can transmit the power to the wireless power receiver circuits 130 wirelessly. The display panel 120 includes a plurality of pixels to which the first and second power supply voltages ELVDD and ELVSS and the data signal DATA are applied. The wireless power receiver circuits 130 can wirelessly receive the power and provide the first power supply voltage ELVDD based on the power to the pixels. The power supply 100 can generate the first and second power supply voltages ELVDD and ELVSS. The power supply 140 can provide the first power supply voltage ELVDD to the wireless power transmitter circuit 110 and provide the second power supply voltage ELVSS to the pixels. In some embodiments, the power supply 140 provides the second power supply voltage ELVSS to the pixels via a common power supply line. The display panel driver 160 can drive the display panel 120. The display panel driver 160 can provide the data signal DATA to the display panel 120. In some embodiments, the display panel driver 160 includes a data driver and a scan driver. The timing controller can control the display panel driver 160.

In some embodiments, the wireless power receiver circuits 130 is formed in a thin film that is arranged under the pixels. Thus, extra space is not required for wireless power transmission. Each of the wireless power receiver circuits 130 can be connected to a plurality of pixels arranged in an N by N matrix, where N is a positive integer.

The display device 1000 can be implemented using various kinds of display panels in so far as the display panel 120 displays an image using first and second power supply voltages ELVDD and ELVSS received from the wireless power transmitter circuit 130 and the power supply 140. For example, the display device 1000 cam be an OLED display. In this embodiment, each of the pixels included in the display panel 120 includes an OLED.

The display device 1000 can have the same structure as the display device 100 of FIG. 1. The structure and operation of the display device 1000 of FIG. 7 are described above with reference to FIGS. 1 to 6. Thus, a detailed description of the display device 1000 included in the system 6000 will not be repeated.

The processor 2000 can control the storage device 3000 and the display device 1000. The processor 2000 can perform specific calculations, computing functions for various tasks, etc. The processor 2000 can include, e.g., a microprocessor or central processing unit (CPU). The processor 2000 can be connected to the storage device 3000 and the display device 1000 via an address bus, a control bus, and/or a data bus. In addition, the processor 2000 can be connected to an extended bus such as a peripheral component interconnection (PCI) bus.

The storage device 3000 can store image data. The storage device 3000 can include a solid state drive (SSD), a hard disk drive (HDD), a CD-ROM, etc.

As discussed above, the system 6000 includes the memory device 4000 and the I/O device 5000. In some embodiments, the system 6000 further includes a plurality of ports (not illustrated) that communicate with a video card, a sound card, a memory card, a universal serial bus (USB) device, other electric devices, etc.

The memory device 4000 can store data for operations of the system 6000. For example, the memory device 4000 can include at least one volatile memory device such as a dynamic random access memory (DRAM) device, a static random access memory (SRAM) device, etc., and/or at least one non-volatile memory device such as an erasable programmable read-only memory (EPROM) device, an electrically erasable programmable read-only memory (EEPROM) device, a flash memory device, etc.

The I/O device 5000 can include one or more input devices (e.g., a keyboard, keypad, a mouse, a touch pad, a haptic device, etc.), and/or one or more output devices (e.g., a printer, a speaker, etc.). In some example embodiments, the display device 1000 can be included in the I/O device 5000.

The system 6000 can include any of several types of electronic devices, such as a digital television, a cellular phone, a smart phone, a personal digital assistant (PDA), a personal media player (PMP), a portable game console, a computer monitor, a digital camera, a moving picture experts group (MPEG) audio layer III (MP3) player, etc.

As described above, the system 6000 including the display device 1000 can include the wireless power transmitter/receiver circuits 110 and 130 to wirelessly transmit the first power supply voltage ELVDD (or the second power supply voltage ELVSS) to the display panel 120, so that the power supply lines for transmitting the first power supply voltage ELVDD (or the second power supply voltage ELVSS) to the pixels can be omitted. Thus, IR-drop across the power supply lines does not occur, so that the system 6000 and the display device 1000 can prevent image quality distortion that would otherwise occur due to IR-drop.

The present embodiments can be applied to any display device and any system including the display device. For example, the present embodiments may be applied to a television, a computer monitor, a laptop, a digital camera, a cellular phone, a smart phone, a smart pad, a PDA, a PMP, an MP3 player, a navigation system, a game console, a video phone, etc.

The foregoing is illustrative of exemplary embodiments, and is not to be construed as limiting thereof. Although a few example embodiments have been described, those skilled in the art will readily appreciate that many modifications are possible in the example embodiments without materially departing from the novel teachings and advantages of the exemplary embodiments. Accordingly, all such modifications are intended to be included within the scope of embodiments as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display device, comprising:

a display panel including a substrate, a plurality of pixels on the substrate each comprising an organic light-emitting diode (OLED) and a driving transistor and a plurality of wireless power receivers formed in a thin film that is arranged between the substrate and the driving transistor, wherein each of the wireless power receivers is connected to a group of the pixels;

a wireless power transmitter configured to: i) generate power based on an initial power supply voltage and ii) wirelessly transmit the generated power to the wireless power receivers, wherein each of the wireless power receivers is configured to: i) wirelessly receive the generated power from the wireless power transmitter, ii) convert the received power into a first power supply voltage, the first power supply voltage being a direct current (DC) voltage, and iii) provide the first power supply voltage to a first electrode of each driving transistor of respective pixels, wherein the wireless power transmitter includes a power transmitter on the display panel to transmit alternating current (AC) power as the generated power to the wireless power receivers;

a power supply configured to: i) generate the initial power supply voltage, ii) provide the initial power supply voltage to the wireless power transmitter and iii), while providing the initial power supply voltage to the wireless power transmitter, generate a second power supply voltage and provide the second power supply voltage to the pixels via a common power supply line electrically connected to each of the pixels, wherein the second power supply voltage is supplied to a terminal of the OLED of each pixel;

a display panel driver configured to drive the display panel; and a timing controller configured to control the display panel driver.

2. The device of claim 1, wherein the wireless power receivers are formed in a thin film that is interposed between the pixels and the substrate.

3. The device of claim 1, wherein each of the wireless power receivers is connected to at least two of the pixels.

4. The device of claim 1, wherein each of the wireless power receivers is connected to a subset of the pixels that are arranged in an N by N matrix, where N is a positive integer.

5. The device of claim 4, wherein the number of the wireless power receivers corresponds to about $1/N^2$, wherein N is an integer equal to or greater than two.

6. The device of claim 1, wherein the first power supply voltage is greater than the second power supply voltage.

7. The device of claim 1, wherein each of the wireless power receivers is further configured to receive the generated power through a mutual resonance with the wireless power transmitter.

8. The device of claim 7, wherein each of the wireless power receivers includes:

a power receiver configured to receive the AC power from the wireless power transmitter;

a rectifier configured to convert the AC power into the first power supply voltage; and an impedance matcher configured to match the output impedance of the power receiver and the input impedance of the rectifier.

9. The device of claim 7, wherein the wireless power transmitter further includes:

an oscillator configured to generate the AC power via oscillating the initial power supply voltage received from the power supply.

10. The device of claim 9, wherein the power transmitter is included in a conductive film that is arranged on the display panel, and wherein the power transmitter includes a resonant coil.

11. The device of claim 9, wherein the oscillator is included in the power supply.

12. The device of claim 1, wherein each of the wireless power receivers is further configured to wirelessly receive the generated power from the wireless power transmitter through electromagnetic induction.

13. A system, comprising:

a storage device configured to store image data;

a display configured to display the image data; and a processor configured to control the storage device and the display, wherein the display includes:

a display panel including a substrate, a plurality of pixels on the substrate each comprising an organic light-emitting diode (OLED) and a driving transistor and a plurality of wireless power receivers formed in a thin film that is arranged between the substrate and the driving transistor, wherein each of the wireless power receivers is connected to a group of the pixels;

a wireless power transmitter configured to: i) generate power based on an initial power supply voltage and ii) wirelessly transmit the generated power to the wireless power receivers, wherein each of the wireless power receivers is configured to: i) receive the generated power from the wireless power transmitter ii) convert the received power into a first power supply voltage, the first power supply voltage being a direct current (DC) voltage, and iii) provide the first power supply voltage to a first electrode of each driving transistor of respective pixels, wherein the wireless power transmitter includes a power transmitter on the display panel to transmit alternating current (AC) power as the generated power to the wireless power receivers;

a power supply configured to: i) generate the initial power supply voltage, ii) provide the initial power supply voltage to the wireless power transmitter, and iii), while providing the initial power supply voltage to the wireless power transmitter, generate a second power supply voltage and provide the second power supply voltage to the pixels via a common power supply line electrically connected to each of the pixels, wherein the second power supply voltage is supplied to a terminal of the OLED of each pixel;

a display panel driver configured to drive the display panel; and a timing controller configured to control the display panel driver.

14. The system of claim 13, wherein each of the wireless power receivers is formed in a thin film that is interposed between the driving transistor of each of the pixels and the substrate, and wherein each of the wireless power receivers is connected a subset of the pixels that are arranged in an N by N matrix, where N is a positive integer.

15. A pixel, comprising:

an organic light-emitting diode (OLED) comprising an anode and a cathode, the cathode electrically connected to a power supply line;

a switching transistor including: i) a gate electrode configured to receive a scan signal, ii) a first electrode configured to receive a data signal, and iii) a second electrode, the switching transistor being on a substrate;

a driving transistor configured to supply a driving current to the OLED, wherein the driving transistor includes: i) a gate electrode connected to the second electrode of the switching transistor, ii) a first electrode configured to receive an initial power supply voltage, and iii) a second electrode connected to the anode of the OLED, the driving transistor being on the substrate;

a wireless power receiver configured to: i) wirelessly receive an initial power from an external wireless power transmitter, ii) convert the received initial power into the initial power supply voltage, the initial power supply voltage being a direct current (DC) voltage, and iii) provide the initial power supply voltage to the first electrode of the driving transistor, the wireless power receiver formed in a thin film that is arranged between the substrate and the switching and driving transistors, the wireless power receiver connected to a plurality of pixels, wherein the external wireless power transmitter is configured to: i) generate the initial power based on an initial voltage and ii) wirelessly transmit the generated initial power to the wireless power receivers, the generated initial power being an alternating current (AC) power, and a power supply is configured to: i) generate the initial voltage, ii) provide the initial voltage to the wireless power transmitter, and iii) generate a second power supply voltage and provide the second power supply voltage to the power supply line; and a storage capacitor including: i) a first electrode connected to the gate electrode of the driving transistor and ii) a second electrode connected to the first electrode of the driving transistor, wherein, while the driving transistor receives the initial power supply voltage, the OLED is configured to receive the second power supply voltage via the power supply line.

16. The pixel of claim 15, wherein the wireless power receiver is formed in a thin film that is interposed between: i) the substrate and ii) the driving transistor and the switching transistor.

17. The pixel of claim 15, wherein the wireless power receiver is further configured to receive the initial power through a mutual resonance with the external wireless power transmitter.

18. The pixel of claim 17, wherein the wireless power receiver includes:

a power receiver configured to receive alternating current (AC) power;

a rectifier configured to convert the AC power into the initial power supply voltage; and an impedance matcher configured to match an output impedance of the power receiver and the input impedance of the rectifier.

19. The pixel of claim 17, wherein the wireless power receiver is further configured to wirelessly receive the initial power from the external wireless power transmitter through electromagnetic induction.

* * * * *